US012619879B2

(12) United States Patent　　　　(10) Patent No.:　US 12,619,879 B2
Metz et al.　　　　　　　　　　　　(45) Date of Patent:　　　May 5, 2026

(54) TRAINING NEURAL NETWORKS USING LEARNED OPTIMIZERS

(71) Applicant: Google LLC, Mountain View, CA (US)

(72) Inventors: Luke Shekerjian Metz, Mountain View, CA (US); Niruban Maheswaranathan, San Jose, CA (US); Christian Daniel Freeman, San Francisco, CA (US); Benjamin Poole, Palo Alto, CA (US); Jascha Narain Sohl-Dickstein, San Francisco, CA (US)

(73) Assignee: Google LLC, Mountain View, CA (US)

( * ) Notice: Subject to any disclaimer, the term of this patent is extended or adjusted under 35 U.S.C. 154(b) by 1240 days.

(21) Appl. No.: 17/481,160

(22) Filed: Sep. 21, 2021

(65) Prior Publication Data

US 2022/0092429 A1　　Mar. 24, 2022

Related U.S. Application Data

(60) Provisional application No. 63/081,269, filed on Sep. 21, 2020.

(51) Int. Cl.
G06N 3/086　　　　(2023.01)
(52) U.S. Cl.
CPC ..................................... G06N 3/086 (2013.01)
(58) Field of Classification Search
CPC ....................................................... G06N 3/086
See application file for complete search history.

(56) References Cited

U.S. PATENT DOCUMENTS

| | | | | |
|---|---|---|---|---|
| 11,941,527 | B2 * | 3/2024 | Jaderberg | ................. G06N 3/08 |
| 12,112,254 | B1 * | 10/2024 | Teig | ....................... G06N 3/084 |
| 2002/0174079 | A1 * | 11/2002 | Mathias | ................. G06N 3/086 |
| | | | | 706/15 |
| 2018/0240010 | A1 * | 8/2018 | Faivishevsky | ........... G06N 3/08 |

(Continued)

OTHER PUBLICATIONS

Auther: Wichrowska Title: Learned Optimizers that Scale and Generalize: (Year: 2017).*

(Continued)

*Primary Examiner* — Cesar B Paula
*Assistant Examiner* — Zelalem Shalu
(74) *Attorney, Agent, or Firm* — Fish & Richardson P.C.

(57)　　　　　　ABSTRACT

Methods, systems, and apparatus, including computer programs encoded on computer storage media, for training a neural network. One of the methods includes performing, using a plurality of training examples, a training step to obtain respective gradients of a loss function with respect to each of the parameters in the parameter tensors; obtaining a validation loss for a plurality of validation examples that are different from the plurality of training examples generating an optimizer input from at least the respective gradients and the validation loss; processing the optimizer input using an optimizer neural network to generate an output defining a respective update for each of the parameters in the parameter tensors of the neural network; and for each of the parameters in the parameter tensors, applying the respective update to a current value of the parameter to generate an updated value for the parameter.

21 Claims, 4 Drawing Sheets

(56) References Cited

U.S. PATENT DOCUMENTS

2020/0380369 A1\* 12/2020 Case ................ G06F 18/23213
2021/0192357 A1\*  6/2021 Sinha ................... G06N 3/088

OTHER PUBLICATIONS

Abadi et al., "Tensorflow: A system for large-scale machine learning," Proceedings of the 12th USENIX Symposium on Operating Systems Design and Implementation, Nov. 2016, 16:265-283.
Andrychowicz et al., "Learning to learn by gradient descent by gradient descent," Advances in Neural Information Processing Systems 29, Dec. 2016, 9 pages.
Baydin et al., "Automatic differentiation of algorithms for machine learning," arXiv, Apr. 28, 2014, 7 pages.
Bello et al., "Neural optimizer search with reinforcement learning," arXiv, Sep. 22, 2017, 12 pages.
Bengio et al., "Advances in optimizing recurrent networks," Presented at IEEE International Conference on Acoustics, Speech and Signal Processing, Vancouver, BC, Canada, May 26-31, 2013, pp. 8624-8628.
Bengio, "Gradient-based optimization of hyperparameters," Neural Computation, Jan. 2000, 12:1890-1900.
Berner et al., "Dota 2 with large scale deep reinforcement learning," arXiv, Dec. 13, 2019, 66 pages.
Choi et al., "On empirical comparisons of optimizers for deep learning," arXiv, Oct. 11, 2019, 29 pages.
Choromanski et al., "Structured evolution with compact architectures for scalable policy optimization," arXiv, Jun. 12, 2018, 16 pages.
Chung et al., "Empirical evaluation of gated recurrent neural networks on sequence modeling," arXiv, Dec. 11, 2014.
Cobbe et al., "Quantifying generalization in reinforcement learning," arXiv, Dec. 20, 2018, 20 pages.
cs.toronto.edu [online], "Cifar-10 and cifar-100 datasets," Sep. 23, 2009, retrieved on Feb. 15, 2022, retrieved from URL<https://www.cs.toronto.edu/~kriz/cifar.html>, 4 pages.
Daniel et al., "Learning step size controllers for robust neural network training," Proceedings of the AAAI Conference on Artificial Intelligence, Feb. 21, 2016, 30(1):1519-1525.
DeepMind.com [online], "Alphastar: Mastering the real-time strategy game StarCraft II," May 20, 2000, retrieved on Jan. 24, 2019, retrieved from URL<https://deepmind.com/blog/article/alphastar-mastering-real-time-strategy-game-starcraft-ii/>, 9 pages.
Devlin et al., "Bert: Pre-training of deep bidirectional transformers for language understanding," arXiv, Oct. 11, 2018, 14 pages.
Dozat, "Incorporating Nesterov Momentum into Adam," Computer Science, Feb. 18, 2016, 4 pages.
Finn et al., "Model-agnostic meta-learning for fast adaptation of deep networks," arXiv, Jul. 18, 2017, 13 pages.
Franceschi et al., "Bilevel programming for hyperparameter optimization and meta-learning," arXiv, Jul. 3, 2018, 12 pages.
Ghemawat et al., "The google file system," Proceedings of the nineteenth ACM symposium on Operating systems principles, Dec. 2003, pp. 29-43.
Golovin et al., "Google Vizier: A Service for Black-Box Optimization," Presented at International Conference on Knowledge Discovery and Data Mining, Halifax, NS, Canada, Aug. 13-17, 2017, 10 pages.
Graves et al., "Neural Turing Machines," arXiv, Dec. 10, 2014, 26 pages.
Gu et al., "Meta-learning biologically plausible semi-supervised update rules," bioRxiv, Dec. 30, 2019, 6 pages.
Harris et al., "Array programming with NumPy," Nature, Sep. 17, 2020, 585:357-362.
Hart et al., "The new compiler," AI Memo 39, 1962, 6 pages.
He et al., "Deep Residual Learning for Image Recognition," Proceedings of the IEEE Conference on Computer Vision and Pattern Recognition, Jun. 2016, 9 pages.

He et al., "Identity Mappings in Deep Residual Networks," European Conference on Computer Vision, Oct. 2016, 16 pages.
Heess et al., "Emergence of Locomotion Behaviours in Rich Environments," arXiv, Jul. 10, 2017, 14 pages.
Hochreiter et al., "Long Short-Term Memory," Neural Computation, 1997, 32 pages.
Hofmann et al., "Letter-Value Plots: Boxplots for Large Data," Technical Report, 2011, 22 pages.
Hubinger et al., "Risks from learned optimization in advanced machine learning systems," arXiv, Jun. 11, 2019, 39 pages.
Hunter, "Matplotlib: A 2D graphics environment," Computing in Science & Engineering, Jun. 2007, 9(3):90-95.
Kingma et al., "Adam: A method for stochastic optimization," arXiv, Dec. 22, 2014, 9 pages.
Kingma et al., "Auto-encoding variational bayes," arXiv, Dec. 27, 2013, 14 pages.
Krizhevsky et al., "ImageNet classification with deep convolutional neural networks," Advances in Neural Information Processing Systems 25, Dec. 2012, 9 pages.
Li et al., "Learning to Optimize Neural Nets," arXiv, Nov. 30, 2017, 10 pages.
Li et al., "Learning to Optimize," Presented at International Conference on Learning Representations, Toulon, France, Apr. 24-26, 2017, 13 pages.
Li et al., "Meta SGD-Learning to Learn Quickly for Few-Shot Learning," arXiv print: 1707.0983, Sep. 28, 2017, 11 pages.
Liu et al., "On the Limited Memory BFGS Method for Large Scale Optimization," Mathematical Programming 45, Aug. 1989, 27 pages.
Loshchilov et al., "Decoupled weight decay regularization," arXiv, Jan. 4, 2019, 19 pages.
Loshchilov et al., "SGDR: Stochastic gradient descent with warm restarts," arXiv, May 3, 2017, 16 pages.
Lv et al., "Learning gradient descent: Better generalization and longer horizons," arXiv, Jun. 10, 2017, 9 pages.
Maclaurin et al., "Gradient-based Hyperparameter Optimization through Reversible Learning," Presented at International Conference on Machine Learning, Lille, France, Jul. 6-11, 2015, 10 pages.
Maheswaranathan et al., "Guided evolutionary strategies: Augmenting random search with surrogate gradients," Presented at International Conference on Machine Learning, Long Beach, CA, Jun. 9-15, 2019, 10 pages.
Metz et al., "Learning unsupervised learning rules," arXiv, May 23, 2018, 25 pages.
Metz et al., "Understanding and correcting pathologies in the training of learned optimizers," Presented at International Conference on Machine Learning, Long Beach, CA, Jun. 9-15, 2019, 10 pages.
Metz et al., "Using a thousand optimization tasks to learn hyperparameter search strategies," arXiv, Apr. 1, 2020, 34 pages.
Metz et al., "Using learned optimizers to make models robust to input noise,", arXiv, Jun. 8, 2019, 8 pages.
Nesterov et al., "Random gradient-free minimization of convex functions," Core Discussion Paper, Jan. 2011, 34 pages.
Nichol et al., "On first-order meta-learning algorithms," arXiv, Oct. 22, 2018, 15 pages.
Nocedal, "Updating Quasi-Newton Matrices with Limited Storage," Mathematics of Computation, Jul. 1980, 35(151):773-782.
Papamakarios et al., "Masked autoregressive flow for density estimation," Advances in Neural Information Processing Systems 30, Dec. 2017, 10 pages.
Pearlmutter, "An investigation of the gradient descent process in neural networks, " Thesis for the degree of Doctor of Philosophy, Carnegie Mellon University, School of Computer Science, Jan. 16, 1996, 140 pages.
Peters et al., "Relative Entropy Policy Search," Proceedings of the Twenty-Fourth AAAI Conference on Artificial Intelligence, Jul. 2010, pp. 1607-1612.
Piech et al., "Deep knowledge tracing", Advances in neural information processing systems 28, Dec. 2015, 9 pages.
Rastrigin, "About convergence of random search method in extremal control of multiparameter systems," Avtomat. i Telemekh, 1963, 24(11):1467-1473 (with English abstract on the last page).

(56)          References Cited

OTHER PUBLICATIONS

Runarsson et al., "Evolution and Design of Distributed Learning Rules," Presented at the IEEE Symposium on Combinations of Evolutionary Computation and Neural Networks, San Antonio, TX, May 11-13, 2000, 5 pages.

Russakovsky et al., "ImageNet Large Scale Visual Recognition Challenge," International Journal of Computer Vision, Apr. 11, 2015, 42 pages.

Salimans et al., "Evolution strategies as a scalable alternative to reinforcement learning," arXiv, Sep. 7, 2017, 13 pages.

Schulman et al., "Proximal Policy Optimization Algorithms," arXiv, Aug. 28, 2017, 12 pages.

Shahriari et al., "Taking the human out of the loop: A review of bayesian optimization.," Proceedings of the IEEE, Jan. 2016, 104(1):148-175.

Shazeer et al., "Adafactor: Adaptive Learning Rates with Sublinear Memory Cost," arXiv, Apr. 11, 2018, 9 pages.

Sivaprasad et al., "On the Tunability of Optimizers in Deep Learning," arXiv, Oct. 25, 2019, 16 pages.

Staines et al., "Variational Optimization," arXiv print: 1212.4507, Dec. 20, 2012, 14 pages.

Strubell et al., "Energy and policy considerations for deep learning in NLP," arXiv, Jun. 5, 2019, 6 pages.

Tallec et al., "Unbiasing Truncated Backpropagation Through Time," arXiv, May 23, 2017, 13 pages.

Van Der Walt et al., "The NumPy array: A structure for efficient numerical computation," Computing in Science & Engineering, Mar./Apr. 2011, 13(2):22-30.

Vaswani et al., "Attention Is All You Need," Advances in Neural Information Processing Systems 30, Dec. 2017, 11 pages.

Werbos, "Backpropagation Through Time: What It Does and How to Do It," Proceedings of the IEEE, Oct. 1990, 78(10):1550-1560.

Wichrowska et al., "Learned optimizers that scale and generalize," Presented at International Conference on Machine Learning, Sydney-Australia, Aug. 6-11, 2017, 10 pages.

Xu et al., "Learning an Adaptive Learning Rate Schedule," arXiv, Sep. 20, 2019, 6 pages.

Xu et al., "Reinforcement Learning for Learning Rate Control," arXiv, May 31, 2017, 7 pages.

yan.lecun.com [online], "The mnist database of handwritten digits," 1998, 5 pages.

zenodo.org [online], "mwaskom/seaborn: v0.11.0 (Sep. 2020)," Sep. 8, 2020, retrieved on Feb. 16, 2022, retrieved from URL <https://zenodo.org/record/4019146#.Yg0hsYjMKUk>, 5 pages.

Zoph et al., "Neural Architecture Search with Reinforcement Learning," arXiv print: 1611.01578, Feb. 15, 2017, 16 pages.

* cited by examiner

200

Perform training step

202

Obtain validation loss

204

Generate optimizer input

206

Process optimizer input using optimizer neural network to generate an output that defines a respective parameter update for each of the parameters 208

Apply the respective updates

210

TRAINING NEURAL NETWORKS USING LEARNED OPTIMIZERS

CROSS-REFERENCE TO RELATED APPLICATION

This application claims priority to U.S. Provisional Application No. 63/081,269, filed on Sep. 21, 2020. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that trains a trainee neural network that is configured to perform a particular machine learning task using an optimizer neural network that generates outputs that specify updates to the parameters of the trainee neural network.

Particular embodiments of the subject matter described in this specification can be implemented so as to realize one or more of the following advantages.

This specification generally describes an optimizer neural network that determines updates to parameter values of another neural network during the training of the other neural network. By using the described optimizer neural network to determine the updates, i.e., instead of an optimization rule or a different optimizer neural network, the training of the other neural network can be improved, resulting in the other network being trained to have improved performance on the machine learning task, the training consuming fewer computational resources, or both. More specifically, because the optimizer neural network has access to additional features, i.e., in addition to features derived from gradients or parameter values, such as validation loss, the updates automatically regularize the training of the other neural network without needing any additional regularization terms or manually specified regularizers. The update steps that are generated by the optimizer exhibit behaviors that are distinct from those generated by the existing optimizers, e.g., first-order optimizers. For example, the described optimizer neural network generates update steps that do not necessarily move in the direction of the gradient, have implicit regularization, adapt as the problem hyperparameters (e.g., batch size) or architecture (e.g., neural network width) change, that have different step sizes per layer of the neural network, and more. All of these features can serve to tailor the updates to the specific other neural network that is being trained, greatly improving the performance of the trained other neural network, reducing the wall clock time required to train the other neural network, or both. Moreover, after being trained, the optimizer neural network generalizes to a wide variety of problems and network architectures, and does not require any user-specified hyperparameters.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
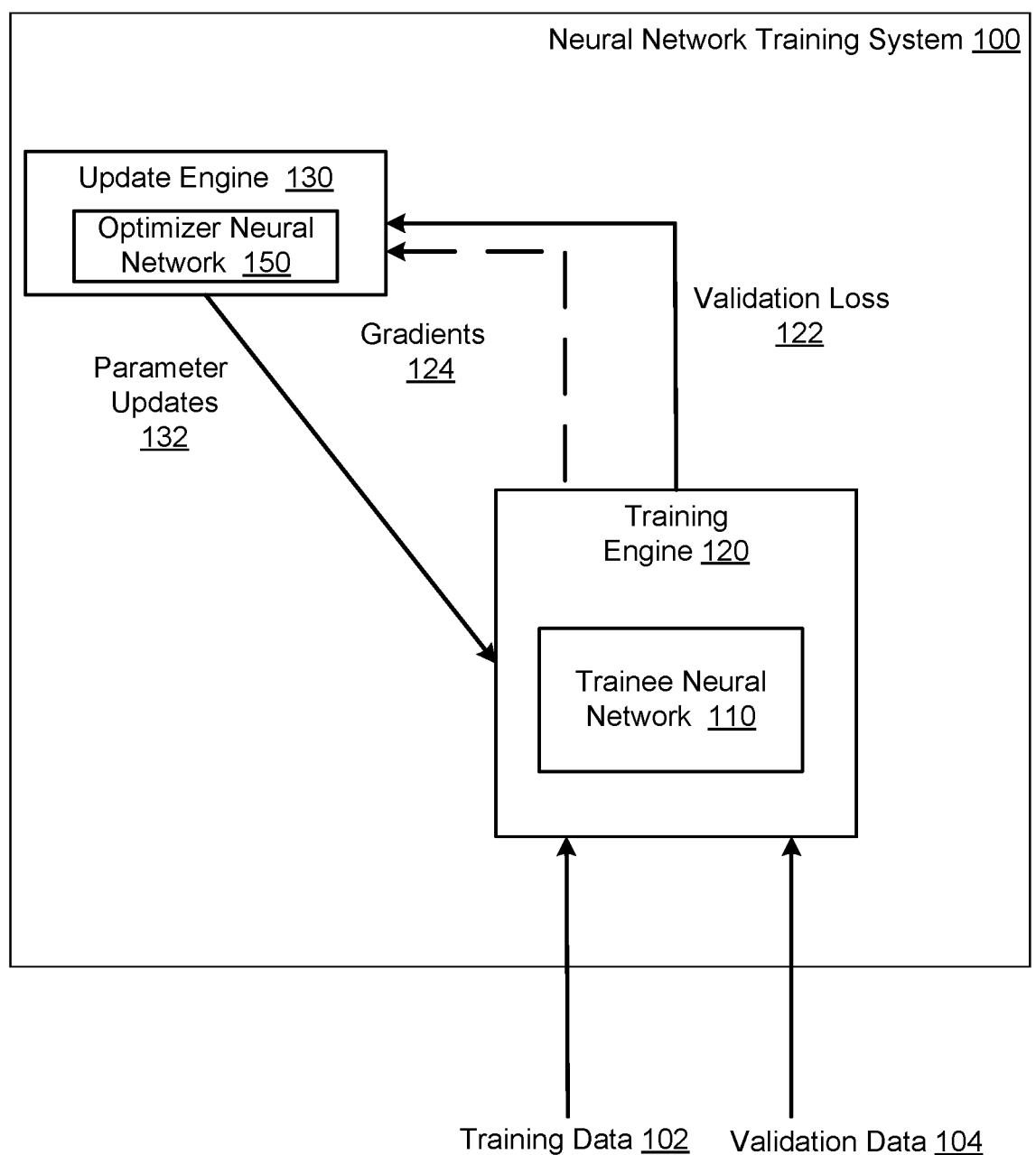
FIG. 1 shows an example neural network training system.

This specification describes a system implemented as computer programs on one or more computers in one or more locations that trains a trainee neural network that is configured to perform a particular machine learning task.

The trainee neural network can be trained to perform any kind of machine learning task, i.e., can be configured to receive any kind of digital data input and to generate any kind of score, classification, or regression output based on the input.

In some cases, the trainee neural network is a neural network that is configured to perform an image processing task, i.e., receive an input image and to process the input image to generate a network output for the input image. For example, the task may be image classification and the output generated by the trainee neural network for a given image may be scores for each of a set of object categories, with each score representing an estimated likelihood that the image contains an image of an object belonging to the category. As another example, the task can be image embedding generation and the output generated by the trainee neural network can be a numeric embedding of the input image. As yet another example, the task can be object detection and the output generated by the trainee neural network can identify locations in the input image at which particular types of objects are depicted. As yet another example, the task can be image segmentation and the output generated by the trainee neural network can assign each pixel of the input image to a category from a set of categories.

As another example, if the inputs to the trainee neural network are Internet resources (e.g., web pages), documents, or portions of documents or features extracted from Internet resources, documents, or portions of documents, the task can be to classify the resource or document, i.e., the output generated by the trainee neural network for a given Internet resource, document, or portion of a document may be a score for each of a set of topics, with each score representing an estimated likelihood that the Internet resource, document, or document portion is about the topic.

As another example, if the inputs to the trainee neural network are features of an impression context for a particular advertisement, the output generated by the trainee neural network may be a score that represents an estimated likelihood that the particular advertisement will be clicked on.

As another example, if the inputs to the trainee neural network are features of a personalized recommendation for a user, e.g., features characterizing the context for the recommendation, e.g., features characterizing previous actions taken by the user, the output generated by the trainee neural network may be a score for each of a set of content items, with each score representing an estimated likelihood that the user will respond favorably to being recommended the content item.

As another example, if the input to the trainee neural network is a sequence of text in one language, the output generated by the trainee neural network may be a score for each of a set of pieces of text in another language, with each score representing an estimated likelihood that the piece of text in the other language is a proper translation of the input text into the other language.

As another example, the task may be an audio processing task. For example, if the input to the trainee neural network is a sequence representing a spoken utterance, the output generated by the trainee neural network may be a score for each of a set of pieces of text, each score representing an estimated likelihood that the piece of text is the correct transcript for the utterance. As another example, the task may be a keyword spotting task where, if the input to the trainee neural network is a sequence representing a spoken utterance, the output generated by the trainee neural network can indicate whether a particular word or phrase ("hot-word") was spoken in the utterance. As another example, if the input to the trainee neural network is a sequence representing a spoken utterance, the output generated by the trainee neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that obtains training data 102 for training a trainee neural network 110 to perform a particular task and a validation set 104 for evaluating the performance of the trainee neural network 110 on the particular task and uses the training data 102 and the validation set 104 to train the trainee neural network 110.

Generally, the training data 102 and the validation set 104 both include a set of neural network inputs and, for each network input, a respective target output that should be generated by the trainee neural network to perform the particular task. For example, a larger set of training data may have been randomly partitioned to generate the training data 102 and the validation set 104. In some cases, e.g., when the system is training the trainee neural network 110 using a semi-supervised learning scheme, the training data 120 may include additional network inputs for which no target output is available.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the trainee neural network, and then divide the specified data into the training data 102 and the validation set 104.

The trainee neural network 110 is a neural network having a set of parameters ("trainee parameters") and that is configured to process network inputs in accordance with the trainee parameters to generate an output for the particular task.

The trainee neural network 110 can have any appropriate architecture that allows the neural network 110 to receive network inputs of the type required by the particular task and to generate network outputs of the form required for the particular task. Examples of trainee neural networks 110 that can be trained by the system 100 include fully-connected neural networks, convolutional neural networks, recurrent neural networks, attention-based neural networks, e.g., Transformers, and so on.

Generally, however, the trainee neural network 110 is configured to perform the machine learning task by processing a network input in accordance with at least a set of parameter tensors each including a plurality of respective parameters to generate a network output for the machine learning task.

Parameter tensors can include weight matrices of fully connected layers or recurrent layers, kernels of convolutional layers, biases of fully-connected or convolutional layers or recurrent layers, and so on.

In other words, the trainee neural network 110 generally has multiple layers of one or more different types, e.g., one or more fully-connected layers, convolutional layers, recurrent layers, self-attention layers, and so on. Some or all of these layers generate an output by transforming the input to the layer using one or more parameter tensors, e.g., multiplying the input to the layer by a weight matrix, adding a bias to an intermediate output of the layer, performing a convolution between the layer input and a kernel, and so on.

Generally, a training engine 120 within the system 100 trains the trainee neural network 110 on the training data 102 to minimize a loss function using gradient descent. The loss function can be any function of network outputs and target outputs that is appropriate for the particular machine learning task. Examples of loss functions include cross-entropy loss functions, squared error loss functions, negative log likelihood loss functions, and so on.

In a gradient descent training technique, at each training step, the training engine 120 computes a gradient 124 of the loss function with respect to the trainee network parameters and on a batch of training inputs selected from the training data 102, determines a parameter value update 132 from at least the computed gradient 124, and then applies the parameter value update 132 to the current values of the trainee parameters of the trainee neural network, i.e., by subtracting or adding the parameter value update with the current parameter values.

By repeatedly performing training steps, the training engine 120 repeatedly updates the values of the trainee parameters to improve the performance of the trainee neural network 110 on the particular task.

The manner in which the system 100 determines the parameter value update 132 is dependent on the optimizer that is being used in the training.

For example, in the stochastic gradient descent optimizer, the update 132 for a given trainee parameter is a product of a learning rate and the gradient.

As another example, in the Adam optimizer, the update 132 for a given trainee parameter is a product of the learning rate and an exponentially decayed average of past gradients.

As another example, in the Adagrad optimizer, the system 100 first adapts the learning rate per weight, i.e., per trainee network parameter, based on the sums of the squares of the gradients and then computes, for each trainee parameter, a product of the gradient with respect to the parameter and the adapted learning rate.

Unlike in conventional systems that use a fixed optimizer like the ones described above, the system 100 includes an update engine 130 that determines the updates 132 that are applied at any given training step using an optimizer neural network 150. That is, the system 100 generates updates using the optimizer neural network 150 instead of using a fixed optimizer to generate the updates.

The optimizer neural network 150 is a neural network having parameters ("optimizer parameters") and that is configured to, at any given training step, receive an optimizer input and to generate an optimizer output that defines, for each trainee parameter, the parameter update 132 that is applied to the current value of the trainee parameter at the training step.

Generally, the optimizer input includes not only the respective gradients 124 for each of the trainee parameters but also a validation loss 122 that has been computed on validation examples from the validation data 104. That is, the validation loss measures the performance of the trainee neural network 110 on the machine learning task for a plurality of validation examples that are different from the plurality of training examples that were used to compute the gradients 124. Including additional features, e.g., the validation loss 122, in the optimizer input assists in the updates 320 automatically regularizing the training of the trainee neural network 110, and yields a better performing trained trainee neural network after the training completes.

The optimizer output can define the parameter update 132 for a given trainee parameter in any of a variety of ways.

As a particular example, the optimizer output can specify, for each trainee parameter (i) a direction for the parameter update 132 for the trainee parameter and (ii) a magnitude value for the parameter update 132 for the trainee parameter.

The update engine 130 can then generate the update 132 by determining an unsigned update from the magnitude, e.g., by directly using the magnitude as the unsigned update or by exponentiating the magnitude value to generate an exponentiation, and then multiplying the unsinged update by the direction for the parameter to generate a product.

In some cases, the update engine 130 uses the product as the update 132 for the parameter.

In other implementations, the update engine 130 applies gradient clipping to the product to generate the update. By applying this gradient clipping, the engine 130 keeps the magnitude of the updates from being extremely large, which can result in chaotic training dynamics which makes learning difficult. The update engine 130 can apply the clipping by doing one or more of: clipping the updates to fall within a specified range, rescaling the update, or rescaling the magnitude.

Thus, at each training step during the training of the trainee neural network, the system 100 uses the optimizer neural network 150 to generate parameter updates 132 for the trainee parameters using the gradients 124 and the validation losses 122 and then applies the parameter updates 132 to the current values of the trainee parameters before.

Training the trainee neural network 110 using the optimizer neural network 150 is described in more detail below with reference to FIGS. 2 and 3.

In some cases, the system 100 trains the optimizer neural network 150 during the training of the trainee neural network 110. That is, the system 100 can perform the training of the optimizer neural network 150 in an "outer loop" while performing training steps for training the trainee neural network 110 and, optionally, one or more other neural networks, in an "inner loop."

Training the optimizer neural network 150 in an "outer loop" of a training process is described in more detail below with reference to FIG. 4.

In some other cases, the system 100 (or another system) has already trained the optimizer neural network 150 during the training of one or more different neural networks, e.g., neural networks having a different architecture from the trainee neural network 110, neural networks being configured to perform different tasks than the trainee neural network 110, or both. That is, once the optimizer neural network 150 has been trained (the optimizer has been "learned"), the updates generated by the optimizer 150 are transferable to improve the training of other neural networks (i.e., neural networks that are different from those that were used in the training of the optimizer) without needing to further train the optimizer 150.

In some implementations, after the trainee neural network 110 has been trained, the system 100 deploys the trained neural network and then uses the trained neural network to process requests received from users, e.g., through the API provided by the system. In other words, after training, the system uses the trained trainee neural network 110 to generate new network outputs for new network inputs.

Instead of or in addition to using the trained neural network 110, the system 100 can provide data specifying the final trainee parameter values to a user who submitted a request to train the trainee neural network, e.g., through the API.

Figure 2:
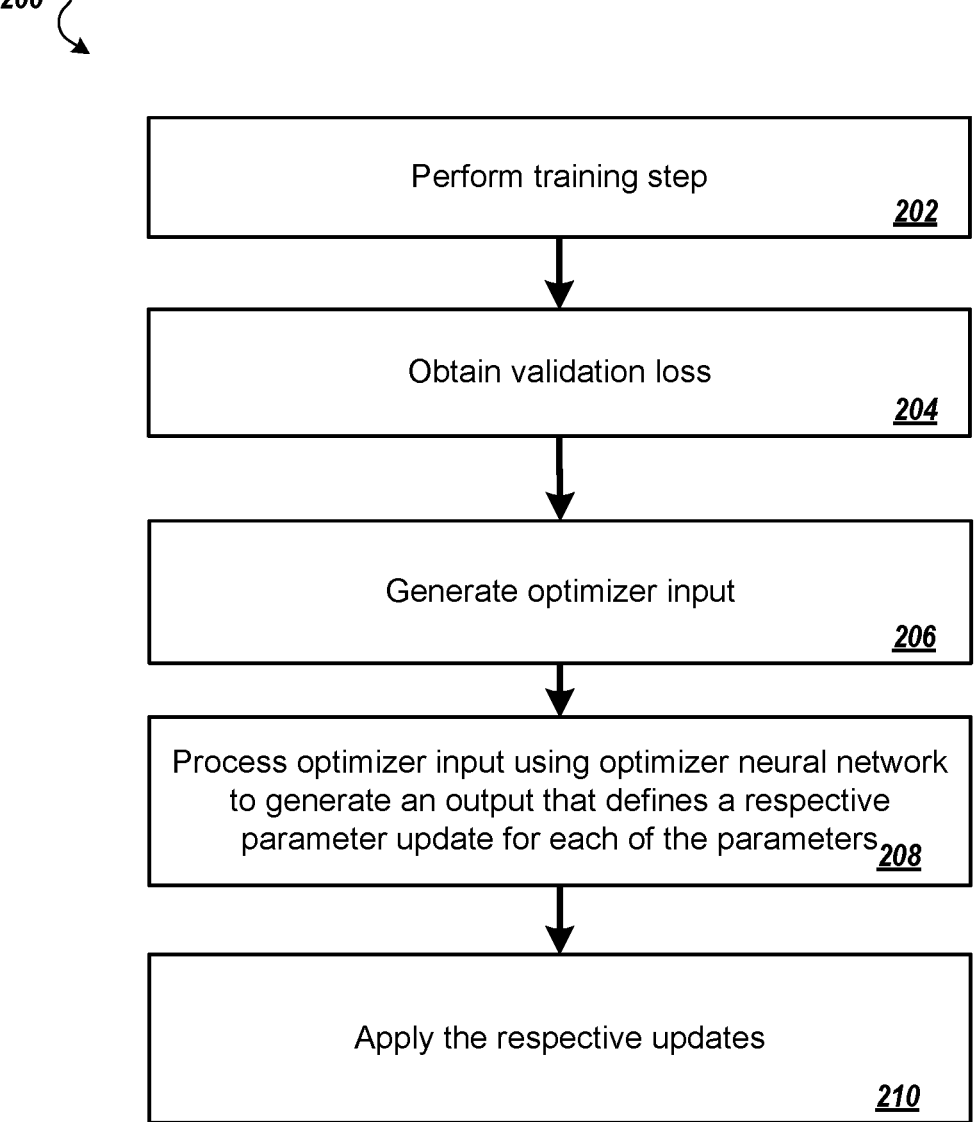
FIG. 2 is a flow diagram of an example process for performing a training step during the training the trainee neural network.

FIG. 2 is a flow diagram of an example process 200 for performing a training step during the training of the trainee neural network. For convenience, the process 200 will be described as being performed by a system of one or more computers located in one or more locations. For example, a neural network training system, e.g., the neural network training system 100 of FIG. 1, appropriately programmed, can perform the process 200.

The system can repeatedly perform the process 200 on different batches of training data to determine trained values of the trainee parameters, i.e., by repeatedly updating the current values of the trainee parameters. For example, the system can continue performing the process 200 until a threshold number of iterations of the process 200 have been performed, until a threshold amount of time has elapsed, or until the values of the trainee parameters have converged.

The system performs a training step on a plurality of training examples, e.g., on a batch of training examples sampled from the training data set, to obtain respective gradients of the loss function for the machine learning task with respect to each of the parameters in the parameter tensors (step 202).

The system can perform the training step by processing each training example in the batch using the trainee neural network in accordance with the current values of the trainee parameters to generate network outputs and then computing the respective gradients based on the network outputs and the target outputs for the training examples using a conventional technique, e.g., backpropagation.

The system obtains a validation loss that measures a performance of the neural network on the machine learning task for a plurality of validation examples that are different from the plurality of training examples, e.g., on a batch of validation examples sampled from the validation data set (step 204).

That is, the system computes the validation loss by evaluating the loss function for a plurality of validation examples.

In some implementations, the system computes a new validation loss at every training step. In these implementations, at every training step, the system processes each validation example in the batch using the trainee neural network in accordance with the current values of the trainee parameters to generate network outputs and then evaluates the loss function using the network outputs and the target outputs for the validation examples.

In some other implementations, the system only updates the validation loss at a proper subset of the training steps, e.g., only updates the validation loss at every k training steps, where k is a constant value that is greater than one. In these implementations, when the current training step is not in the proper subset, the system can (i) use the most-recently computed validation loss as the validation loss for the training step, (ii) use a placeholder validation loss that indicates that no validation loss was computed at the training step, or (iii) not use a validation loss in generating the optimizer input. When the current training step is in the proper subset, the system computes a new validation loss as above.

The system generates an optimizer input from at least the respective gradients and the validation loss (step 206) and processes the optimizer input using the optimizer neural network to generate an optimizer output defining a respective update for each of the parameters in the parameter tensors (step 208). In some cases, the system also uses the training loss, i.e., the loss computed by evaluating the loss function using the network outputs generated for the training examples in the batch and the target outputs for the training examples, to generate the optimizer input.

Generating the optimizer input and processing the optimizer input using the optimizer neural network will be described below with reference to FIG. 3.

For each of the trainee parameters, i.e., for each of the parameters in the parameter tensors of the layers of the trainee neural network, the system applies the respective update to the current value of the trainee parameter to generate an updated value for the trainee parameter (step 210). That is, the system uses the optimizer input to compute a respective update for each trainee parameter as described above with reference to FIG. 1 and then applies the update, i.e., adds the update to or subtracts the update from, the current value of the trainee parameter to generate the updated value for the trainee parameter.

Figure 3:
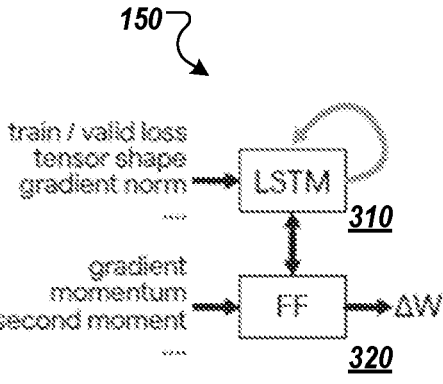
FIG. 3 shows the operation of the optimizer neural network at a training step during the training of the trainee neural network.

FIG. 3 shows the operation of the optimizer neural network 150 at a training step during the training of the trainee neural network.

As described above, at each training step the optimizer neural network 150 receives an optimizer input and generates an output that defines a respective update ("ΔW") for each trainee parameter W.

As shown in FIG. 3, the optimizer neural network 150 is hierarchical and receives as input features that are not derived from the gradient, e.g., features that are computed from the validation loss as described above, in addition to input features that are derived from the gradient.

In particular, the optimizer neural network 150 includes a per-tensor neural network 310 that operates independently for each of the parameter tensors and a per-parameter neural network 320 that operates independently for each of the plurality of parameters of each of the parameter tensors.

As shown in the example of FIG. 3, the per-tensor neural network 310 is a recurrent neural network and the per-parameter neural network 320 is a feedforward neural network. For example, the per-parameter neural network 320 can be a multi-layer perceptron (MLP).

More specifically, in the example of FIG. 3, the per-tensor neural network 310 is shown as an LSTM. However, instead of an LSTM, any other appropriate recurrent architecture, e.g., a gated recurrent unit (GRU) based architecture, can be used for the per-tensor neural network 310. Because the per-tensor neural network 310 operates independently for each tensor, the system maintains and updates a separate internal state for each of the parameter tensors.

Thus, the optimizer input at any given training step includes a respective tensor input for each of the tensors that is processed by the per-tensor neural network and a respective parameter input for each of the parameters that is processed by the per-parameter neural network.

At a high level, for each parameter tensor, the per-tensor neural network processes the respective tensor input for the parameter tensor and the hidden state for the parameter tensor to generate a tensor output for the training iteration and to update the hidden state for the parameter tensor.

Generally, the tensor input for a given parameter tensor includes (i) aggregated features that are generated from features for the parameters in the given parameter tensor and (ii) global features that include features that are global to the entire tensor or the entire neural network. The system can generate the tensor input by concatenating the aggregated features and the global features. This ensures that the tensor input for each parameter tensor has the same size regardless of how many parameters are in the parameter tensor.

The global features include features that are generated from the validation loss. Examples of such features include rolling averages, rolling second moments, and so on.

The global features can also include one or more features that are generated from the training loss. Examples of such features include rolling averages, rolling second moments, and so on.

The global features can also include data specifying the shape of the parameter tensor.

The global features can also include features from the processing of the optimizer neural network at the preceding training step.

As one example, these features can include a feature generated from, e.g., by applying a linear projection to, outputs generated by the per-tensor neural network for all of the parameter tensors when updating the parameters at a preceding training step. That is, the tensor output for each training step can include a designated component that is used to generate global features for the next training step. The system can combine, e.g., concatenate, these designated portions from all of the tensor outputs and use the combination to generate the global features for the next training step.

As another example, these features can include a feature generated from, e.g., by applying a linear projection to, outputs generated by the per-parameter neural network for all of the parameters in the parameter tensor when updating the parameters at the preceding training step. That is, the parameter output for each training step can include a designated component that is used to generate global features for the next training step (in addition to a designated component that defines the update for the parameter). The system can combine, e.g., concatenate, these designated portions from all of the parameter outputs for all of the parameters in the parameter tensor and use the combination to generate the global features for the next training step.

The features for each parameter of the tensor, i.e., the features that are aggregated to generate the aggregated features in the tensor input, generally include features generated from the gradient of the parameter. Examples of such features include the gradient itself, a normalized gradient generated by applying normalization to the gradient, a rolling average of the gradient, a rolling second moment of the gradient, and so on. Optionally, these features can include other information, e.g., the current value of the parameter, a rolling average of the values of the parameter, and so on.

To generate a given aggregated feature, the system aggregates the values of the given feature for all of the parameters in the parameter tensor. The system can perform this aggregation by applying any appropriate reduction operation that reduces the values of the given feature for the parameters into a single scalar value, e.g., a sum operation, a mean operation, a maximum operation, a minimum operations, and so on.

Generally, the tensor output for a given parameter tensor includes (i) a designated portion that is used to generate the parameter inputs for the parameters in the given parameter tensor and (ii) in some cases, another designated portion that will be used at the next training step, as described above.

For each trainee parameter, the per-parameter neural network processes the parameter input for the trainee parameter to generate a parameter output that (i) defines the update to the trainee parameter, e.g., the direction and the magnitude as described above and, in some cases, (ii) that includes the designated portion that will be used at the next training step.

The parameter input for a given parameter is generated from at least (i) the gradient for the parameter and (ii) the tensor output of the per-tensor neural network for the parameter tensor to which the corresponding parameter belongs generated by processing the corresponding tensor input for training step. Thus, the tensor outputs generated by the per-tensor neural network for a given parameter tensor are used to provide additional context for the per-parameter neural network when generating the outputs that define the updates for the trainee parameters in the given parameter tensor.

Examples of features of the gradient that can be included in the parameter input include gradient itself, a normalized gradient generated by applying normalization to the gradient, a rolling average of the gradient, a momentum of the gradient, a rolling second moment of the gradient, and so on. Optionally, the parameter input can include other information, e.g., the current value of the parameter, a rolling average of the values of the parameter, and so on.

Thus, at each training step, the system generates a respective tensor input for each parameter tensor and processes each tensor input using the per-tensor neural network 310 to generate a respective tensor output for each parameter tensor.

For each parameter tensor, the system then generates a parameter input for each parameter in the tensor from the tensor output for the tensor and processes the parameter inputs using the per-parameter neural network 320 to generate the parameter outputs that define the updates for the parameters in the parameter tensor.

Figure 4:
FIG. 4 is a flow diagram of an example process for performing a training step during the training of the optimizer neural network.
Figure 4:
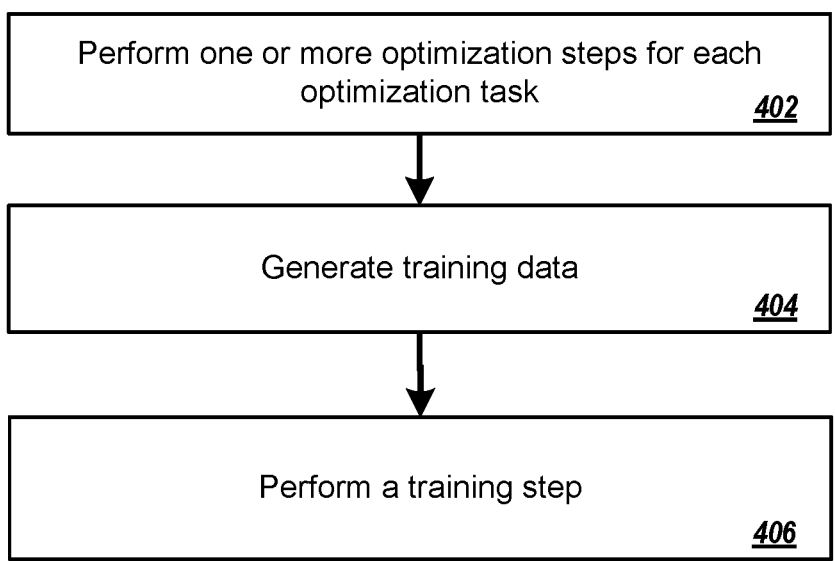

FIG. 4 is a flow diagram of an example process 400 for performing a training step during the training of the optimizer neural network. For convenience, the process 400 will be described as being performed by a system of one or more computers located in one or more locations. For example, a neural network training system, e.g., the neural network training system 100 of FIG. 1, appropriately programmed, can perform the process 400.

The system can repeatedly perform the process 400 whenever certain criteria are satisfied during the optimization of a respective set of "inner" parameters for each one or more inner optimization tasks to update the values of the optimizer parameters of the optimizer neural network. For example, the system can perform the process 400 after a threshold number of optimization steps for each set of the inner optimization tasks have been performed since a preceding iteration of the process 400.

Generally, the one or more inner optimization tasks includes one or more tasks that each require training a neural network. When one of the inner optimization tasks is training a neural network, the inner parameters for that task are the parameters of the neural network. When the inner optimization tasks include training multiple neural networks, the neural networks can have different architectures and can be configured to perform different tasks. For example, the multiple neural networks can include any combination of RNNs, CNNs, fully connected networks, language modeling neural networks, variational autoencoder neural networks, flow-based generative neural networks, and so on. Including multiple different neural networks in the set of inner optimization tasks can assist in allowing the optimizer neural network to generalize to new, unseen neural networks and tasks after the optimizer has been trained.

Thus, when the trainee neural network described above is being trained jointly with the optimizer neural network, training the trainee neural network is one of the inner optimization tasks.

Optionally, to further improve the generalization of the optimizer neural networks, the one or more inner optimization tasks can include non-neural network optimization tasks that have parameters and that can be optimized using gradient descent. Examples of such tasks include 2D test functions, quadratic bowls, and so on.

Once the optimizer neural network has been trained by repeatedly performing the process 400 during the optimization of the "inner parameters", the controller neural network can be used (without re-training) to generate parameter updates for the training of a new trainee neural network. Thus, when the optimizer neural network has already been trained prior to being used in the training of the trainee neural network, the optimizer neural network can have been trained using a set of inner optimization tasks that does not include training the trainee neural network. More specifically, the trainee neural network can have a different architecture, be configured to perform a different task, or both, than any neural network that was in the set of inner optimization tasks used to train the optimizer neural network.

For each of the inner optimization tasks, the system performs one or more optimization steps in accordance with the current values of the optimizer parameters (step 402). For each neural network in the set of one or more inner optimization tasks, performing an optimization step means performing a training step to update the parameters of the neural network using updates generated using the optimizer neural network in accordance with current values of the optimizer parameters. In particular, the system can perform a predetermined number of optimization steps for each of the inner optimization tasks.

The system generates, from results of the optimization steps, training data for training the optimizer neural network (step 404) and performs a training step to train the optimizer neural network on the training data to optimize an objective for the training of the optimizer neural network (step 406).

In particular, the objective measures the performance of the optimizer neural network in generating the parameter updates for the one or more inner optimization tasks at the one or more optimization steps. Thus, when the trainee neural network described above is being trained as part of the "inner loop," the objective measures (i) the performance of the optimizer neural network in generating updates for the trainee parameters. When the set of inner tasks also includes a plurality of other neural networks, the objective also measures (ii) a performance of the optimizer neural network in generating updates during training a plurality of other neural networks to perform a plurality of other machine learning tasks.

As a particular example, the objective can be based on the validation loss for each of the inner optimization tasks.

For example, the objective can be to minimize the mean of the validation loss computed after each of the one or more training steps, averaged over the inner optimization tasks. Thus, to generate the training data, for each inner optimization task and after each optimization step, the system computes a respective validation loss for a corresponding plurality of validation examples.

When computing the validation loss after each of the training steps, the system can use a different set of validation examples from the validation examples that were used to generate the validation losses for the inputs to the optimizer for the corresponding training steps.

The system can use any of a variety of techniques to train the optimizer neural network.

For example, the system can train the optimizer neural network using a conventional gradient-based technique, e.g., stochastic gradient descent, Adam, or rmsProp by backpropagating through the unrolled inner optimization to compute gradients with respect to the optimizer parameters of the objective. This is possible because the objective is differentiable.

However, backpropagating through the unrolled inner optimization is computationally expensive and the outer-loss surface can be badly conditioned and non-smooth, making it difficult to optimize. Thus, the system can instead perform the training step using derivative-free optimization. For example, the system can perform one or more iterations of an evolution strategies (ES) technique or one or more iteration of a Persistent Evolutionary Strategies (PES) technique to optimize the objective.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this speci-
fication in the context of separate embodiments can also be
implemented in combination in a single embodiment. Con-
versely, various features that are described in the context of
a single embodiment can also be implemented in multiple
embodiments separately or in any suitable subcombination.
Moreover, although features may be described above as
acting in certain combinations and even initially be claimed
as such, one or more features from a claimed combination
can in some cases be excised from the combination, and the
claimed combination may be directed to a subcombination
or variation of a subcombination.

Similarly, while operations are depicted in the drawings
and recited in the claims in a particular order, this should not
be understood as requiring that such operations be per-
formed in the particular order shown or in sequential order,
or that all illustrated operations be performed, to achieve
desirable results. In certain circumstances, multitasking and
parallel processing may be advantageous. Moreover, the
separation of various system modules and components in the
embodiments described above should not be understood as
requiring such separation in all embodiments, and it should
be understood that the described program components and
systems can generally be integrated together in a single
software product or packaged into multiple software prod-
ucts.

Particular embodiments of the subject matter have been
described. Other embodiments are within the scope of the
following claims. For example, the actions recited in the
claims can be performed in a different order and still achieve
desirable results. As one example, the processes depicted in
the accompanying figures do not necessarily require the
particular order shown, or sequential order, to achieve
desirable results. In some cases, multitasking and parallel
processing may be advantageous.

What is claimed is:

1. A method of training a first neural network configured
to perform a machine learning task by processing a network
input in accordance with at least a set of parameter tensors
each including a plurality of respective parameters to gen-
erate a network output for the machine learning task, the
method comprising repeatedly performing operations com-
prising:

performing, using a plurality of training examples, a
training step to obtain respective gradients of a loss
function for the machine learning task with respect to
each of the parameters in the parameter tensors of the
first neural network;

obtaining a validation loss that measures a performance of
the first neural network on the machine learning task
for a plurality of validation examples that are different
from the plurality of training examples used to obtain
the respective gradients;

processing an optimizer input that includes i) features
derived from the respective gradients of the loss func-
tion for the machine learning task obtained using the
training examples and ii) features that are computed
from the validation loss that measures a performance of
the first neural network on the plurality of validation
examples that are different from the plurality of training
examples using an optimizer neural network to gener-
ate an output defining a respective update for each of
the parameters in the parameter tensors of the first
neural network, wherein the respective updates auto-
matically regularize the training of the first neural
network and reduce time required to train the first
neural network; and for each of the parameters in the parameter tensors,
applying the respective update to a current value of the
parameter to generate an updated value for the param-
eter.

2. The method of claim 1, further comprising:
generating, from results of the training step, training data
for training the optimizer neural network; and
performing a training step to train the optimizer neural
network on the training data to optimize an objective
that measures a performance of the optimizer neural
network in generating at least the respective updates.

3. The method of claim 2, wherein the objective measures
(i) the performance of the optimizer neural network in
generating the respective updates and (ii) a performance of
the optimizer neural network in generating updates during
training a plurality of other neural networks to perform a
plurality of other machine learning tasks.

4. The method of claim 2, wherein performing the training
step comprises performing one or more iterations of an
evolution strategies (ES) technique to optimize the objec-
tive.

5. The method of claim 1, wherein the optimizer neural
network has been trained to optimize an objective that
measures a quality of parameter updates generated by the
optimizer neural network for a plurality of machine learning
tasks that does not include the machine learning task.

6. The method of claim 1, wherein the optimizer neural
network comprises:

(i) a per-tensor neural network that operates indepen-
dently for each of the parameter tensors, and
(ii) a per-parameter neural network that operates indepen-
dently for each of the plurality of parameters of each of
the parameter tensors.

7. The method of claim 6, wherein the per-tensor neural
network is a recurrent neural network and the per-parameter
neural network is a feedforward neural network.

8. The method of claim 7, wherein the per-parameter
neural network is a multi-layer perceptron.

9. The method of claim 6, wherein the per-parameter
neural network generates, for each parameter, an output that
comprises (i) a direction for the parameter update for the
parameter and (ii) a magnitude value for the parameter
update for the parameter.

10. The method of claim 9, further comprising:
for each parameter, generating the update, comprising
exponentiating the magnitude value for the parameter
to generate an exponentiation and multiplying the
exponentiation by the direction for the parameter to
generate a product.

11. The method of claim 10, wherein generating the
update further comprises applying gradient clipping to the
product to generate the update.

12. The method of claim 6, wherein the optimizer input
comprises a respective tensor input for each of the parameter
tensors and a respective parameter input for each of the
parameters of each of the parameter tensors.

13. The method of claim 12, wherein generating the
optimizer input comprises:

generating the tensor input for each of the parameter
tensors from at least (i) the validation loss and (ii)
gradients for the parameters in the parameter tensor.

14. The method of claim 13, wherein generating the tensor
input for each of the parameter tensors further comprises
generating the tensor input from at least (iii) a training loss
for the training step for the plurality of training examples.

15. The method of claim 12, wherein generating the tensor
input for each of the parameter tensors further comprises generating the tensor input from at least (iv) outputs generated by the per-tensor neural network when updating the parameters at a preceding training step.

16. The method of claim 12 wherein generating the tensor input for each of the parameter tensors further comprises generating the tensor input from at least (v) outputs generated by the per-parameter neural network for the parameters in the corresponding parameter tensor when updating the parameters at a preceding training step.

17. The method of claim 12, wherein generating the optimizer input comprises:

generating the parameter input for each of the parameters from at least (i) the gradient for the parameter and (ii) an output of the per-tensor neural network generated by processing the corresponding tensor input for the parameter tensor to which the parameter belongs.

18. The method of claim 17, wherein generating the parameter input for each of the parameters further comprises generating the parameter input from at least (iii) a current value of the parameter.

19. The method of claim 1, wherein:

the optimizer neural network generates updates to the parameters at each training step in a sequence of training steps, and the validation loss is updated after each of a proper subset of the training steps.

20. One or more non-transitory computer-readable media storing instructions that when executed by one or more computers cause the one or more computers to perform operations for training a first neural network configured to perform a machine learning task by processing a network input in accordance with at least a set of parameter tensors each including a plurality of respective parameters to generate a network output for the machine learning task, the operations comprising:

performing, using a plurality of training examples, a training step to obtain respective gradients of a loss function for the machine learning task with respect to each of the parameters in the parameter tensors of the first neural network;

obtaining a validation loss that measures a performance of the first neural network on the machine learning task for a plurality of validation examples that are different from the plurality of training examples used to obtain the respective gradients;

processing an optimizer input that includes i) features derived from the respective gradients of the loss function for the machine learning task obtained using the training examples and ii) features that are computed from the validation loss that measures a performance of the first neural network on the plurality of validation examples that are different from the plurality of training examples using an optimizer neural network to generate an output defining a respective update for each of the parameters in the parameter tensors of the first neural network, wherein the respective updates automatically regularize the training of the first neural network and reduce time required to train the first neural network; and for each of the parameters in the parameter tensors, applying the respective update to a current value of the parameter to generate an updated value for the parameter.

21. A system comprising one or more computers and one or more storage devices storing instructions that when executed by one or more computers cause the one or more computers to perform operations for training a first neural network configured to perform a machine learning task by processing a network input in accordance with at least a set of parameter tensors each including a plurality of respective parameters to generate a network output for the machine learning task, the operations comprising:

performing, using a plurality of training examples, a training step to obtain respective gradients of a loss function for the machine learning task with respect to each of the parameters in the parameter tensors of the first neural network;

obtaining a validation loss that measures a performance of the first neural network on the machine learning task for a plurality of validation examples that are different from the plurality of training examples used to obtain the respective gradients;

processing an optimizer input that includes i) features derived from the respective gradients of the loss function for the machine learning task obtained using the training examples and ii) features that are computed from the validation loss that measures a performance of the first neural network on the plurality of validation examples that are different from the plurality of training examples using an optimizer neural network to generate an output defining a respective update for each of the parameters in the parameter tensors of the first neural network, wherein the respective updates automatically regularize the training of the first neural network and reduce time required to train the first neural network; and for each of the parameters in the parameter tensors, applying the respective update to a current value of the parameter to generate an updated value for the parameter.

* * * * *